May 13, 1924.
D. R. COUGHLIN
Re. 15,836
THEFTPROOF ELECTRIC LIGHT BULB
Original Filed Oct. 28, 1920
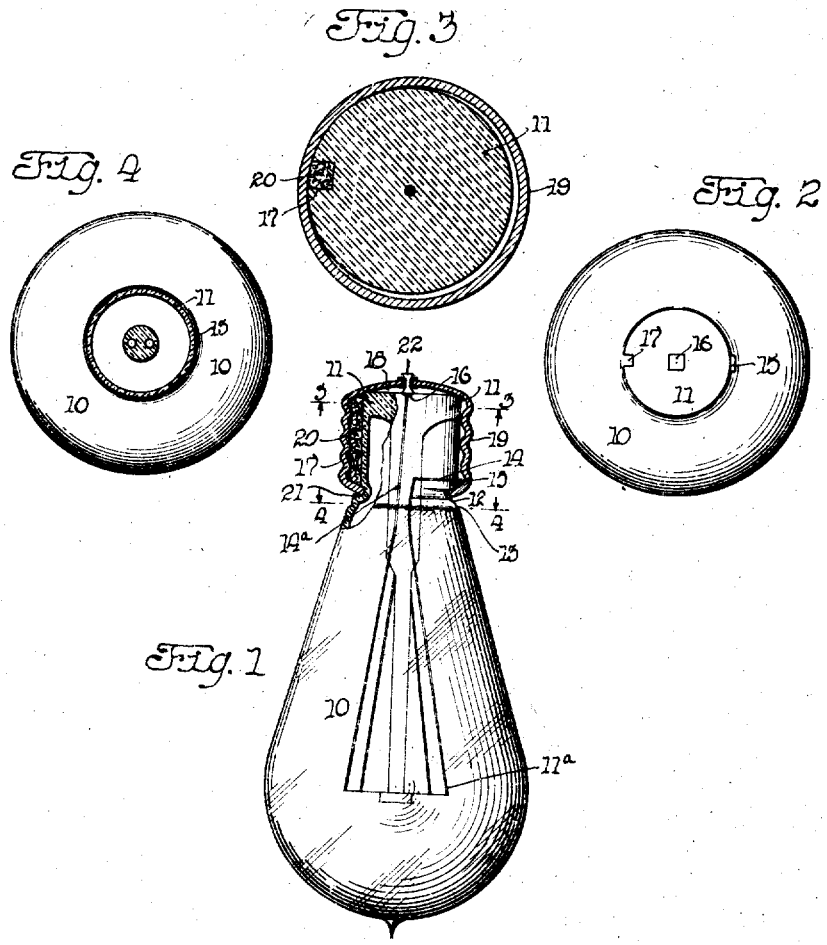
Inventor
Daniel R. Coughlin
By Jones, Addington, Ames & Seibold
Attorneys Reissued May 13, 1924.

BEST AVAILABLE COPY

Re. 15,836

UNITED STATES PATENT OFFICE.

DANIEL R. COUGHLIN, OF DES MOINES, IOWA, ASSIGNOR, BY MESNE ASSIGNMENTS, TO KULP THEFT PROOF LAMP CO., A CORPORATION OF ILLINOIS.

THEFTPROOF ELECTRIC-LIGHT BULB.

Original No. 1,437,723, dated December 5, 1922, Serial No. 420,089, filed October 28, 1920. Application for reissue filed December 28, 1923. Serial No. 683,227.

*To all whom it may concern:*

Be it known that I, DANIEL R. COUGHLIN, a citizen of the United States, and a resident of Des Moines, in the county of Polk and State of Iowa, have invented a certain new and useful Theftproof Electric-Light Bulb, of which the following is a specification.

The object of my invention is to provide an electric-light bulb of simple construction, so made that it may be inserted into a socket for making proper circuit connections in the ordinary way, and then can not be stolen or removed from the socket.

With this and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of an electric-light bulb embodying my invention, parts being shown in section.

Figure 2 shows a top or plan view of the same with the threaded shell contact removed.

Figure 3 shows a horizontal, detailed, sectional view taken on the line 3—3 of Figure 1; and, Figure 4 shows a horizontal, detailed, sectional view taken on the line 4—4 of Figure 1.

It is well-known that railroad companies and others suffer substantial losses on account of the theft of electric-light bulbs or globes, which are taken from stations, cars and other places to which the public has access.

It is so easy to remove the ordinary bulb from the socket, that it is found that places of the kind mentioned, empty houses and other places, are frequently robbed of these bulbs and the aggregate losses suffered in the country at large are great.

It is my purpose to provide a bulb, which can be used in the ordinary way with the ordinary socket, and which when once installed in the socket can not be removed until the bulb is broken.

In the accompanying drawings, I have used the reference numeral 10 to indicate the body of an electric-light bulb or globe which is of ordinary construction. At the smaller end of the bulb or globe 10, the glass is extended in substantially cylindrical form away from the body, as at 11.

At the point of juncture between the body 10 and the cylindrical extension 11, there is provided an annular groove or recess 12. In the exterior surface of the body 10 near the groove 12, there is provided a smaller annular groove 13, the purpose of which will be hereinafter more fully referred to.

The filament lead or current conducting member in the bulb is extended laterally through the wall of the extension 11, as at 14, and a drop of solder or the like 15 is placed on the outer end of the lead 14, outside of the glass of the member 11. The other filament lead or conducting member $14^a$ is extended longitudinally through the member 11, and has a similar drop 16 of solder or conducting material outside the member 11. It will, of course, be understood that the filament $11^a$ is connected with the leads 14 and $14^a$.

The member 11 is formed with a longitudinal groove 17 in its exterior side wall, as shown in Figures 2 and 3, and a metal casing 18 commonly called a threaded shell contact is provided, and is formed with spiral screw-threads 19, as is the case in ordinary electric-light bulbs, and is arranged to be extended over the member 11.

In the installation of the shell contact 18, soft plaster of Paris or the like 20 is placed in the groove 17 when the casing is placed in position, and this plaster of Paris will rapidly harden for holding the shell contact 18 against rotation on the member 11.

The lower end or edge of the shell contact 18 is crimped or bent inwardly until it is received in the groove 12, as illustrated at 21.

Extending through the shell contact 18 is a contact member 22, which will contact with the drop 16, which forms a contact member. The contact member 22, it will be understood, is insulated from the shell contact 18 in the ordinary way.

In the practical use of my improved theftproof bulb, the bulb is initially screwed into the socket in the ordinary way until the contacts are made. The lamp may then be used in the usual manner and removed at will. If, however, it is desired to render this bulb theftproof, the bulb is given an additional turn for breaking or displacing the plaster bond 20.

It will then be seen that if a thief should attempt to unscrew the bulb and remove it, the glass portion will rotate freely in the shell contact 18 and cannot be removed. The bulb is then used until the filament is burned out.

Thereupon the bulb body may be struck sharply, and it will break cleanly along the line of the groove 13. Thereafter access may be had to the interior of the member 11 and to the edge of the shell contact 19 with the fingers or with a suitable tool, and the shell contact 18 may be unscrewed from the socket and removed, for permitting the installation of a new bulb.

The saving to be accomplished by using the bulb of the type herein shown is obvious from the foregoing description.

Changes may be made in the construction of my device, and it is my intention to provide a device comprising an electric-light bulb, so arranged that when it is once installed in the socket, it can not be removed without breakage, and it is my purpose to cover by my claims, any modified forms of structure or use of mechanical equivalents, which may be reasonably included within their scope.

Having thus described my invention, what I claim as new and desire to secure by Letters Patent of the United States is:

1. An electric lamp comprising a bulb body having an extension, a threaded shell-contact mounted on said extension provided with an insulated center contact, said shell contact and bulb body being provided with means to prevent longitudinal separation and to permit relative rotation therebetween, a filament in said bulb, means for maintaining connecton between said filament and said shell and center contacts during relative rotation of said contacts and the bulb body, and frangible means between said shell-contact and said extension to normally prevent relative rotation therebetween.

2. An electric lamp, comprising a bulb, a shell contact having an insulated center contact mounted thereon, said shell contact and bulb being provided with means to prevent longitudinal separation and to permit relative rotation therebetween, a filament in said bulb, means for maintaining connection between said filament and said shell and center contacts during relative rotation of said contacts and the bulb, and frangible means between said shell contact and said bulb to normally prevent relative rotation therebetween.

3. An electric lamp comprising a bulb, and a shell-contact and an insulated center contact therefor, means fixing the shell contact against longitudinal movement in respect to said bulb member, displaceable means initially fixing said bulb against rotation in respect to said shell contact and purposely designed to be displaced by the exertion of a predetermined force to effect such rotation, a filament in said bulb, and means for maintaining electrical connection between said filament and said shell and center contacts regardless of the rotation of the bulb member with respect to the shell contact.

4. An electric lamp comprising a bulb, and a shell-contact and an insulated center contact therefor, permanently disengageable means initially fixing said bulb against rotation in respect to said shell contact and purposely designed to be disengaged by the exertion of a predetermined force to effect such rotation, a filament in said bulb, and means for maintaining electrical connection between said filament and said shell and center contacts regardless of the rotation of the bulb member with respect to the shell contact.

5. In an electric lamp, a bulb, a center contact and a shell contact therefor, means for initially securing the bulb against rotation in respect to said shell contact, said means being purposely designed for permitting the bulb to be independently rotatable after the exertion of a predetermined force to effect independent rotation thereof, and means for maintaining electrical connection between the lamp filament and the shell and center contacts regardless of the rotation of the bulb.

6. In an electric lamp, a bulb, a center contact and a shell contact therefor, said lamp being adapted to be inserted in a socket solely by rotating the same, means for initially securing the bulb against rotation in respect to said shell contact, said means being purposely designed for permitting the bulb to be independently rotatable after the exertion of a predetermined force to effect independent rotation thereof, and means for maintaining electrical connection between the lamp filament and the shell and center contacts regardless of the rotation of the bulb.

7. In combination an electric lamp member including a bulb, and a shell contact and an insulated center contact therefor, means preventing longitudinal movement of the shell contact in respect to said bulb, said lamp member being formed with a depression adjacent said shell contact, permanently displaceable means within said depression and initially fixing said bulb against rotation in respect to said shell contact until such means is displaced by the exertion of a predetermined force to effect such rotation, a filament in said bulb, and means for maintaining electrical connection between said filament and said shell and center contacts regardless of the rotation of the bulb with respect to the shell contact.

8. In combination, an enclosure for electrical apparatus, a cylindrical shell mounted on said enclosure, means for preventing unauthorized removal of the enclosure from the shell, said shell being provided with means for engaging a supporting receptacle by turning movement of said shell, and permanently disengageable means initially fixing said enclosure against rotation in respect to said shell to normally permit insertion and removal of the shell in respect to a receptacle by turning said enclosure, said disengageable means being purposely designed to be rendered inoperative, to permit removal of the shell, by the exertion of a predetermined force to effect further inward turning of the enclosure in respect to the receptacle.

9. In combination, an enclosure for electrical apparatus, a cylindrical shell contact mounted on said enclosure, said shell contact being provided with means for engaging a conventional electrical receptacle solely by turning movement of said shell contact, permanently disengageable means initially fixing said enclosure against rotation in respect to said shell contact to normally permit insertion and removal of the shell contact in respect to a receptacle by turning said enclosure, said disengageable means being designed to be rendered inoperative to permit removal of the shell by the exertion of a predetermined force to effect further turning of the enclosure after the shell contact has been inserted to operative position in a receptacle, and means for maintaining electrical connection between the apparatus in said enclosure and said shell contact regardless of the rotation of the enclosure with respect to the shell contact.

10. In combination, an electric lamp bulb provided with a shell contact, means for mounting thereon the shell contact to be initially fixed against rotation in either direction in respect thereto, said means being purposely designed for permitting said bulb to be rotatable in respect to said contact in either direction after being subjected to a predetermined force to render said means ineffective, and means for supplying electrical energy to the lamp through said shell contact after such rotation of the bulb.

11. In combination an electric lamp bulb provided with a substantially cylindrical supporting shell, said shell being provided with means for engaging a supporting receptacle by turning movement of said shell, means for mounting said shell on the bulb to be initially fixed against rotation in either direction in respect thereto, said last named means being purposely designed for permitting said bulb to be rotatable in respect to said shell in either direction after being subjected to a predetermined force to render said means ineffective, and means for preventing removal of the bulb from the shell.

12. An electric lamp comprising a bulb, a threaded shell contact therefor, means permanently fixing said shell contact against longitudinal movement in respect to said bulb, displaceable means permanently incorporated in the lamp for preventing said shell contact from turning in respect to the bulb while the lamp is being inserted in a receptacle by turning the bulb, said means being purposely designed to be displaceable by rotation of the bulb to permit the bulb to be revolved in respect to the contact and thereby to prevent removal of the lamp from the receptacle by turning the bulb, and means for supplying electrical energy to the lamp through said contact after the lamp has been revolved in respect to the contact.

13. An incandescent lamp consisting of a bulb, and center and shell contacts therefor, the shell contact being screw-threaded in the conventional manner, and connected to the bulb so as to permit of the lamp being screwed into a socket by simple rotation of the bulb, said connection being purposely designed to be releasable by forced rotation of the bulb after the lamp is screwe home so that the bulb will then rotate independently of the shell contact, and means for maintaining electrical connection between the lamp filament and the contacts notwithstanding such independent rotation of the bulb.

In testimony whereof, I have hereunto subscribed my name this 22nd day of December, 1923.

DANIEL R. COUGHLIN.